United States Patent Office 3,399,168
Patented Aug. 27, 1968

3,399,168
IMPROVING THE PROCESSIBILITY OF MACRO-
MOLECULAR FORMALDEHYDE POLYMERS
WITH AMINE-AMIDE STABILIZERS
Johannes J. M. Evers, Sittard, and Harmannus Bos,
Geleen, Netherlands, assignors to Stamicarbon
N.V., Heerlen, Netherlands
No Drawing. Filed June 28, 1963, Ser. No. 291,243
Claims priority, application Netherlands, July 3, 1962,
280,493
8 Claims. (Cl. 260—45.9)

The present invention relates to a process for improving the processibility of macromolecular formaldehyde polymers, particularly homopolymers or copolymers prepared by polymerization of either purely gaseous formaldehyde or trioxane, with or without the use of an inert, liquid dispersing agent and a polymerization initiator. Suited comonomers are for example styrene, halogenated or unhalogenated acetaldehyde, cyclic esters or cyclic ethers, such as glycidyl-esters, ethylene oxide or dioxolan.

It is known that compounds containing amino or amido-groups may be added as stabilizers to improve the resistance of the abovementioned polymers. Thus, for example, British Patent 748,856 mentions secondary or tertiary aromatic amides as compounds for this purpose while British Patent 860,410 refers to synthetic polyamides, and Belgian Patent 584,257 discloses amides of polybasic carboxylic acids. Additionally, French Patent 1,253,553 refers, inter alia, to aliphatic, aromatic, cyclo-aliphatic or heterocyclic compounds containing one or more primary, secondary or tertiary amido-groups.

Beligan Patent 591,578 also mentions several classes of compounds which can be considered as amines or hydrazines. Among the compounds mentioned in this Belgian patent are two classes which include both amino and amido-groups and are represented by the following formulae:

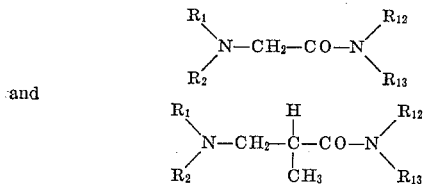

and wherein $R_1$ and $R_2$ represent alkyl, cyclo-alkyl, or aralkyl groups, and $R_{12}$ and $R_{13}$ represent hydrogen atoms or alkyl, cycloalkyl, or aralkyl groups.

According to the present invention, it has now been found that the processability of macromolecular formaldehyde polymers can be considerably improved by adding, before or during processing, one or more compounds which include both at least one amino group and at least one amido group, with either the N-atom of each of these groups always bound to a substituted or unsubstituted aryl group or the N-atoms of an amino and an amido group simultaneously bound to a substituted or unsubstituted arylene group. This very significantly improves the properties of macromolecular formaldehyde polymers as evidenced by the fact that while these polymers without the addition of one or more of these compounds, decompose to a considerable extent at processing temperatures of 185 to 195° C. (as indicated, for example, by the smell of formaldehyde, a decrease in polymer viscosity and an increase in melt index), these same polymers can be readily processed upon addition of the compounds proposed for use herein. The mechanical properties of the products made from these polymers are also favorably influenced by this addition.

Broadly stated, therefore, the invention provides a process for improving the processability of macromolecular formaldehyde polymers by adding thereto, before or during processing, one or more compounds containing amino and amido groups, and selected from the class consisting of:

(a) Compounds containing at least one

group and at least one

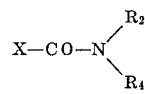

group; and (b) Compounds containing at least one

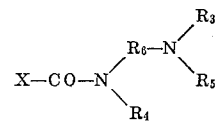

group wherein $R_1$ and $R_2$ are selected from the class consisting of substituted and unsubstituted aryl; $R_3$, $R_4$ and $R_5$ are selected from the class consisting of hydrogen atoms and substituted and unsubstituted alkyl and cycloalkyl; $R_6$ is selected from the class consisting of substituted and unsubstituted arylene; and X is a hydrocarbon group.

Examples of compounds which can be used in the process according to the invention are: α-anilino-acetanilide, α-anilino-p-acetotoluide, β-anilino-isobutyric acid anilide, β,β-di-anilino-isobutyric acid anilide, p-amino-isobutyric acid anilide, ω-anilino-caproic acid anilide, ω-anilino-undecylic acid anilide, 8-anilino-heptadecanecarboxylic acid anilide, p-amino-stearic acid anilide, p-dimethylamino-stearic acid anilide.

The above-mentioned compounds may be added to the formaldehyde polymer in practically any amount desired. However, to achieve a distinctly perceptible effect, the amount added should, as a rule, be equal to at least 0.01% by weight, with respect to the amount of formaldehyde polymer. By preference, the compounds are added in amounts varying from 0.1 to 10% by weight with respect to the amount of formaldehyde polymer.

The compounds may be added to the formaledhyde polymer in any known way desired. They may, for instance, be intimately mixed in the dry state with the likewise dry formaldehyde polymer in a conventional type of mixing device. They may also be suspended or dissolved in a suitable dispersing agent in which the formaldehyde polymer is also suspended, after which the resulting mixture is evaporated to dryness. The compounds may also be added to the formaldehyde polymer on a heated or unheated roll mill, or during the processing of the polymer, for instance, in an extruder. The compounds may also be added before or during the polymerization.

Other substances, such as stabilizers against oxidation or discoloration, fillers, pigments and the like, may also be added to the macromolecular formaldehyde polymers prior to, during or after processing according to the invention.

Any of the known types of macromolecular formaldehyde polymers may be used herein including, for example, those which have been previously subjected to conventional chemical treatments such as acetylation or ether formation. Usually, the molecular weight of the polymer which is processed according to the invention will fall in the range of 3,000 to 300,000 as evidenced by an inherent viscosity of 0.5 to 20 when measured at 60° C. as a solution comprising 0.5 g. of polymer in 100 ml. p-chlorophenol containing 2% α-pinene. However, molecular weights outside this range may also be used.

The invention is illustrated, but not limited, by the following example:

EXAMPLE

The influence of the addition of compounds, according to the invention, on the processability of macromolecular formaldehyde polymers may be demonstrated by the tests using polymers prepared by polymerization of gaseous formaldehyde in an inert dispersing agent. These polymers are characterized by their inherent viscosity (measured at 60° C. on a solution of 0.5 g. of polymer in 100 ml. of p-chlorophenol, containing 2% of α-pinene) and by the percentage decomposed in the first 10 minutes during heating at 220° C. The latter quantity is determined by introducing about 0.05 g. of the polymer into a furnace, heated at 220° C., through which nitrogen is passed at the rate of 1.5 liter per hour, leading the escaping gases over cupric oxide heated at 700° C. whereby the formaldehyde is oxidized to carbon dioxide and, finally, collecting this gas in pyridine and continuously titrating it with sodium methanolate.

If these polymers, without modification according to the invention, are fed to a roll mill heated at 190° C., a considerable evolution of formaldehyde is observed within 5 minutes, and the originally highly viscous mass soon becomes thinly liquid and flows off the roll. The product obtained is a brittle mass of stringy structure which cannot be further processed into, for instance, injection-molding grains or sheets.

Similarly, if 0.1% by weight of the anti-oxidant 4,4'-butylidene-bis-(3-methyl-6-tertiary butyl phenol) is added to these polymers before they are fed to the mill, the behaviour of the polymer on the mill does not differ from that demonstrated without addition of this antioxidant.

To samples of the above polymers, a number of compounds were subsequently added in amounts of 1% by weight with respect to the amount of polymer along with 0.1% by weight of the above-mentioned antioxidant. When these mixtures were fed to a roll mill heated at 190° C., no formaldehyde evolution was observed. The viscous mass adhered well to the mill and did not become stringy. The melt-index of the resulting products (determined in accordance with "A.S.T.M. test method D 1238/57T" at 190° C.) was considerably lower than that of the products obtained by rolling the starting polymers without the addition of the above-mentioned substances.

Plaques pressed from the resulting rolled sheets were tested for the following mechanical properties:

(1) the tensile strength and the percentage elongation in accordance with "A.S.T.M. test method D 638/58T." For this purpose, the dimensions of the test rod (type C) were chosen in accordance with "A.S.T.M. test method D 412"; tensile velocity: 3 cm./minute at 20° C.;

(2) the modulus of elasticity (in accordance with "A.S.T.M. test method D 638/58T" at 20° C.);

(3) the energy value in the tensile impact test in accordance with H. H. Racké's method, Materialprüfung 3, 89 (1961); tensile velocity: 3 m. per second at 20° C.

The results of the above-mentioned measurements are shown in the table below wherein the vertical columns represent the following:

First column — The inherent viscosity of the starting polymer.
Second column — The percentage decomposition in the first 10 minutes during heating of the starting polymer at 220° C.
Third column — The compound added.
Fourth column — The inherent viscosity of the product after rolling.
Fifth column — The percentage decomposition of the rolled product during the first 10 minutes of heating at 220° C.
Sixth column — The melt-index of the product after rolling, g./10 minutes.
Seventh column — The tensile strength of the product after rolling, kg./cm.$^2$.
Eighth column — The percentage elongation of the product after rolling.
Ninth column — The modulus of elasticity of the product after rolling, kg./cm.$^2$.
Tenth column — The energy value in the tensile-impact test of the product atfer rolling, kg.-cm./cm.$^2$.

TABLE

| Starting polymer | | Compound added | Product after rolling | | | | | | |
|---|---|---|---|---|---|---|---|---|---|
| Inherent viscosity | Decomposition at 220° C., percent weight | | Inherent viscosity | Decomposition at 220° C., percent weight | Melt-index | Tensile strength | Percentage elongation | Modulus of elasticity | Energy tensile-impact test |
| 1.95 | 4.9 | ω-Anilino-undecylic acid anilide | 2.14 | 0.8 | 4.6 | 660±20 | 11.0±2.5 | | 80±25 |
| 2.38 | 6.5 | ....do.... | 2.18 | 1.8 | 4.7 | 710±40 | 28±7 | 27,700 | 140±100 |
| 1.95 | 4.1 | β-anilino-isobutyric acid anilide | 2.00 | 2.4 | 6.2 | 675±30 | 16±9 | 26,000 | 270±70 |
| 1.95 | 6.5 | p-Amino-stearic acid anilide | 1.96 | 3.6 | 6.0 | 639±15 | 11.2±2.1 | 29,400 | 75±35 |

Various modifications may be made in the invention described above. Hence, the scope of the invention is outlined in the following claims.

We claim:

1. A polymer composition of improved processability comprising a macromolecular formaldehyde polymer and at least one compound selected from the class consisting of:

(a) compounds containing at least one

group and at least one

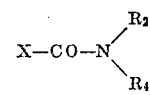

group; and (b) compounds containing at least one

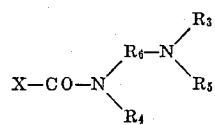

group wherein $R_1$ and $R_2$ are aryl; $R_3$, $R_4$ and $R_5$ are selected from the class consisting of hydrogen atoms, alkyl and cycloalkyl; and $R_6$ is arylene; and X is a hydrocarbon group.

2. A shaped article made from the polymer composition of claim 1.

3. A polymer composition according to claim 1 containing from 0.1 to 10% by weight of said compound based on the weight of polymer.

4. A polymer composition according to claim 1 wherein said compound is ω-anilino-undecylic acid anilide.

5. A polymer composition according to claim 1 wherein said compound is β-anilino-isobutyric acid anilide.

6. A polymer composition according to claim 1 wherein said compound is p-amino-stearic acid anilide.

7. The polymer composition of claim 1 wherein said compound is selected from the group consisting of α-anilino-acetanilide, α-anilino-p-acetotoluide, β-anilino-isobutyric acid anilide, β,β-di-anilino-isobutyric acid anilide, p-amino-isobutyric acid anilide, ω-anilino-caproic acid anilide, ω-anilino-undecylic acid anilide, 8-anilino-heptadecanecarboxylic acid anilide, p-amino-stearic acid anilide, p-dimethylamino-stearic acid anilide.

8. A shaped article made from the polymer composition of claim 7.

References Cited

UNITED STATES PATENTS

| | | | |
|---|---|---|---|
| 2,993,025 | 7/1961 | Alsup et al. | 260—45.95 |
| 3,131,165 | 4/1964 | Hermann et al. | 260—45.9 |
| 3,274,149 | 9/1966 | Berardinelli | 260—45.9 |

FOREIGN PATENTS

| | | |
|---|---|---|
| 591,578 | 10/1960 | Belgium. |
| 927,610 | 5/1963 | Great Britain. |

DONALD E. CZAJA, *Primary Examiner.*

M. J. WELSH, *Assistant Examiner.*